US006241866B1

(12) United States Patent
Mir

(10) Patent No.: US 6,241,866 B1
(45) Date of Patent: Jun. 5, 2001

(54) ELECTRODEIONIZATION APPARATUS WITH FIXED ION EXCHANGE MATERIALS

(76) Inventor: Leon Mir, 15 Hobart Rd., Newton, MA (US) 02459

( * ) Notice: Subject to any disclaimer, the term of this patent is extended or adjusted under 35 U.S.C. 154(b) by 0 days.

(21) Appl. No.: 09/394,170

(22) Filed: Sep. 13, 1999

(51) Int. Cl.[7] ............................. B01D 61/44; B01D 61/48
(52) U.S. Cl. .................... 204/524; 204/523; 204/522; 204/520; 204/518; 204/450; 204/634; 204/633; 204/632; 204/631; 204/630; 204/627
(58) Field of Search .................................. 204/634, 632, 204/524, 533, 242, 252, 273, 295, 296, 194; 422/186

(56) References Cited

U.S. PATENT DOCUMENTS

| Re. 35,741 | 3/1998 | Oren et al. ............................. 204/524 |
| 4,632,745 | 12/1986 | Giuffrida et al. ..................... 204/301 |
| 4,636,296 | 1/1987 | Kunz ................................. 204/182.5 |

(List continued on next page.)

OTHER PUBLICATIONS

P–Series Heavy Industrial CDI® Systems Single and Multiple Module, United States Filer Corporation, Lowell, Massachusetts.
Deionization, EDI and Membranes: Practical Ways to Reduce Chemical Usage when Producing High–Purity Water, Ultrapure Water® Jul./Aug. 1999, pp. 52–55.
Gary C. Ganzi et al., Water Purification and Recycling Using the CDI Process, Ionpure Technologies Corp., Lowell, MA 01851, pp. 49–53. Feb. 1992.
E. Glueckauf, M.Sc., D.Sc., Electro–Deionisation Through a Packed Bed, Dec. 1959, pp. 646–651.
O. Kedem et al., A Simple Electrodialysis Stack, Desalination, 24 (1978) pp. 313–319, Elsevier Scientific Publishing Company, Amsterdam—Printed in The Netherlands. *No month available.

Primary Examiner—Kathryn Gorgos
Assistant Examiner—Michael Feely
(74) Attorney, Agent, or Firm—Fish & Richardson P.C.

(57) ABSTRACT

Electrodeionization apparatus for purifying water that includes a cathode, an anode, and a plurality of alternating anion permeable membranes and cation permeable membranes between the cathode and anode that define concentrating and diluting flow channels between adjacent pairs of membranes. The diluting channels include cation exchange materials and anion exchange materials that are fixed in close contacting position with respect to each other and provide conductive paths for cations and anions to the adjacent membranes and provide flow passages for water between the materials. The anion exchange materials and cation exchange materials each have a characteristic dimension that is smaller than the characteristic dimensions of the flow passages. The use of exchange materials with small dimensions and the fixed intimate contact of cation and anion exchange materials provides increased, uniform water splitting and resin regeneration, and a high rate of ion removal from the water flowing through the diluting channels compartments. An increased velocity can be provided in the diluting channels of by reintroducing a portion of the water from the diluting channel outlet to the diluting channel inlet or using flow diverters in the diluting channel to provide a tortuous path for the flowing water.

27 Claims, 4 Drawing Sheets

U.S. PATENT DOCUMENTS

| | | | |
|---|---|---|---|
| 4,747,929 | 5/1988 | Siu et al. | 204/301 |
| 4,753,681 | 6/1988 | Giuffrida et al. | 134/22.17 |
| 4,804,451 | 2/1989 | Palmer | 204/301 |
| 4,871,431 | 10/1989 | Parsi | 204/182.4 |
| 4,931,160 | 6/1990 | Giuffrida | 204/301 |
| 4,956,071 | 9/1990 | Giuffrida et al. | 204/301 |
| 5,019,270 | 5/1991 | Afeyan et al. | 210/656 |
| 5,026,465 | 6/1991 | Katz et al. | 204/182.4 |
| 5,066,375 | 11/1991 | Parsi et al. | 204/182.4 |
| 5,093,197 | 3/1992 | Howard et al. | 428/372 |
| 5,116,509 | 5/1992 | White | 210/644 |
| 5,120,416 | 6/1992 | Parsi et al. | 204/182.4 |
| 5,154,809 | 10/1992 | Oren et al. | 204/182.4 |
| 5,203,976 | 4/1993 | Parsi et al. | 204/182.4 |
| 5,228,989 | 7/1993 | Afeyan et al. | 210/198.2 |
| 5,292,422 * | 3/1994 | Liang et al. | 204/301 |
| 5,308,466 | 5/1994 | Ganzi et al. | 204/151 |
| 5,308,467 | 5/1994 | Sugo et al. | 204/301 |
| 5,316,637 | 5/1994 | Ganzi et al. | 204/182.4 |
| 5,346,924 * | 9/1994 | Giuffrida | 521/28 |
| 5,376,253 | 12/1994 | Rychen et al. | 204/301 |
| 5,384,042 | 1/1995 | Afeyan et al. | 210/198.2 |
| 5,425,866 * | 6/1995 | Sugo et al. | 204/304 |
| 5,503,729 | 4/1996 | Batchelder et al. | 204/630 |
| 5,512,173 | 4/1996 | Uchino et al. | 204/632 |
| 5,531,899 | 7/1996 | Yen et al. | 210/638 |
| 5,558,753 | 9/1996 | Gallagher et al. | 204/632 |
| 5,584,981 * | 12/1996 | Turner et al. | 204/536 |
| 5,593,563 | 1/1997 | Denoncourt et al. | 204/524 |
| 5,679,228 | 10/1997 | Elyanow et al. | 204/524 |
| 5,679,229 | 10/1997 | Goldstein et al. | 204/524 |
| 5,681,438 | 10/1997 | Proulx | 204/627 |
| 5,738,775 | 4/1998 | Nagai et al. | 204/632 |
| 5,759,373 | 6/1998 | Terada et al. | 204/524 |
| 5,762,774 | 6/1998 | Tessier | 204/524 |
| 5,833,861 | 11/1998 | Afeyan et al. | 210/656 |
| 5,858,191 | 1/1999 | DiMascio et al. | 204/524 |
| 5,868,915 | 2/1999 | Ganzi et al. | 204/524 |
| 5,961,805 * | 10/1999 | Terada et al. | 204/632 |
| 6,056,878 | 5/2000 | Tessier et al. | 210/639 |

* cited by examiner

ELECTRODEIONIZATION APPARATUS WITH FIXED ION EXCHANGE MATERIALS

BACKGROUND OF THE INVENTION

The invention relates to apparatus and methods for carrying out electrodeionization to purify water.

Electrodeionization is a process for removing ions from liquids by sorption of these ions into a solid material capable of exchanging these ions for either hydrogen ions (for cations) or hydroxide ions (for anions) and simultaneous or later removal of the sorbed ions into adjacent compartments by the application of an electric field. (See Glueckauf, E., "Electro-Deionization Through a Packed Bed", December 1959, pp. 646–651, British Chemical Engineering for a background discussion.) The hydrogen and hydroxide ions needed to drive the ion exchange process are created by splitting of water molecules at the interface of anion and cation exchanging solids which contact each other in the orientation that depletes the contact zone of ions, when in the presence of an electric field. This orientation requires that the anion exchanging material face the anode and the cation exchanging material face the cathode. The created hydroxide ions enter the anion exchanging material, and the created hydrogen ions enter the cation exchanging material.

The electrodeionization process is commonly carried out in an apparatus consisting of alternating diluting compartments and concentrating compartments separated by anion permeable and cation permeable membranes. The diluting compartments are filled with porous ion exchanging solid materials through which the water to be deionized flows. The ion exchanging materials are commonly mixtures of cation exchanging resins and anion exchanging resins (e.g., U.S. Pat. No. 4,632,745), but alternating layers of these resins have also been described (e.g., U.S. Pat. Nos. 5,858, 191 and 5,308,467). Ion exchanging materials consisting of woven and non-woven fibers have also been described. E.g., U.S. Pat. No. 5,308,467 describes a fabric in which bundles of cation-exchange fibers and are woven alternately with bundles of anion-exchange fibers, and U.S. Pat. No. 5,512, 173 describes a cloth containing cation exchange fibers, anion exchange fibers and ionically inactive fibers. The compartments adjoining the diluting compartment into which the ions are moved by the applied electric field, called concentrating compartments, may be filled with ion exchanging materials or with inert liquid permeable materials. An assembly of one or more pairs of diluting and concentrating compartments, referred to as a "cell pair", is bounded on either side by an anode and a cathode which apply an electric field perpendicular to the general direction of liquid flow.

The diluting compartments are each bounded on the anode side by an anion permeable membrane and on the cathode side by a cation permeable membrane. The adjacent concentrating compartments are each correspondingly bounded by a cation permeable membrane on the anode side and an anion permeable membrane on the cathode side. The applied electric field causes anions to move from the diluting compartment across the anion permeable membrane into the concentrating compartment nearer the anode and cations to move from the diluting compartment across the cation permeable membrane into the concentrating compartment nearer the cathode. The anions and cations become trapped in the concentrating compartments because the movement of anions toward the anode is blocked by a cation permeable membrane, and the movement of cations toward the cathode is blocked by an anion permeable membrane. A flow of water is set up to remove the ions from the concentrating compartments. The net result of the process is the removal of ions from the water stream flowing through the diluting compartments and their concentration in the water flowing through the concentrating compartments.

The removal of the ions from the diluting compartment is a multi-step process involving diffusive steps as well as electrically driven steps. First, it is clear that the movement of ions directly from the diluting solution across the bounding membranes, under the influence of the applied electric field, contributes insignificantly to the overall removal of these ions, because the concentration of ions in the diluting solution is typically 1,000 to 100,000 times smaller than the concentration of ions in the solid ion exchanging materials. While the mobility of ions in the solid material may be on the order of 20 times smaller than their mobility in the solution, the electric field acting on the ions in the two phases is the same, so the product of mobility times concentration times electric field strength, which determines the rate of ion removal, is 50 to 5,000 times as large in the solid ion exchanging material.

Glueckauf showed that the mechanism of ion removal from the diluting compartment solution includes two steps. The first step is the diffusion of cations to the cation exchanging solids and the diffusion of anions to the anion exchanging solids. The second step is electrical conduction within the solids phases to the bounding membranes of the diluting compartment. Because the concentration of ions in ion exchanging solids is so high, the process that controls the overall removal of ions is their rate of diffusion from the solution to the surface of the ion exchanging solids. This diffusion rate is a function of three factors; the diffusion rate is proportional to surface area between the ion exchanging solids and the flowing solution, inversely proportional to the thickness of the liquid layer through which the ions must diffuse, and proportional to the difference in concentration of the ions in the bulk of the diluting solution and their concentration next to the ion exchanging solid. In order to achieve high rates of ion removal, the product of the above three factors should thus be as high as possible. The ratio of the surface area to the diffusion distance is inversely proportional to the characteristic dimension of the ion exchanging solid material; the characteristic dimension is particle radius for ion exchange resins and is fiber diameter for ion exchange fibers. In designing electrodeionization apparatus, this characteristic dimension can be made as small as possible, commensurate with avoidance of excessive pressure drops or plugging by particles in the water to be treated. Particle diameters on the order of 500 to 600 micrometers are typical, and fiber diameters can be on the order of several tens of microns.

As noted above, the third factor controlling the rate of ion removal is the difference in concentration of the ion being removed between the bulk of the solution and its concentration in the liquid adjacent to the surface of the ion exchanging solid where it is being exchanged for either a hydrogen or a hydroxide ion. The concentration of the ion in question at the surface of the ion exchanging solid is in equilibrium with the concentration of that ion in the solid. For cations, the equilibrium concentration is approximately equal to the ratio of the cation concentration to the hydrogen ion concentration in the cation exchanging solid times the concentration of the cation in solution. For anions, the equilibrium concentration is approximately equal to the ratio of the anion concentration to the hydroxide ion concentration in the anion exchanging solid times the concentration of the anion in solution. In order for this equilibrium concentration to be low, and the rate controlling concentration difference to be large, the cation exchanging solid should be predominantly in the hydrogen form, and the anion exchanging solid should be predominantly in the hydroxide form. In fact, if the two solids are completely in the ionic form rather than in the hydrogen or hydroxide form, there is no concentration difference, and ions will not be removed by this diffusive mechanism.

In order for the ion exchanging solids to be predominantly in the hydrogen and hydroxide forms, the so-called "regenerated forms," the rate of hydrogen ion and hydroxide ion creation (water splitting) must be both high and spatially uniform. A high average rate of water splitting can be achieved by applying a high voltage drop across the diluting compartment. With equinormal mixtures of ion exchange particles, voltages of between 1 and 5 volts are adequate for the purpose. The achievement of a uniform distribution of water splitting is a more difficult problem and much effort has gone into designing structures that achieve this (e.g., U.S. Pat. Nos. 5,858,191, 5,868,915 and 5,308,467). The random nature of mixtures of cation and anion exchanging particles tends to cause some portion of the particles to be regenerated to a needlessly high degree and others inadequately regenerated. Water flowing through the regions of inadequately regenerated material will be inadequately purified. The essence of the difficulty that existing approaches have had in dealing with the problem is that the number of contacts between cation exchanging and anion exchanging material where water splitting can take place is limited by the relatively large characteristic dimension of the ion exchanging material. This results in regions of inadequately regenerated resin between the water splitting sites.

SUMMARY OF THE INVENTION

In one aspect, the invention features, in general, electrodeionization apparatus for purifying water. The apparatus includes a cathode, an anode, and a plurality of alternating anion permeable membranes and cation permeable membranes between the cathode and anode that define concentrating and diluting flow channels between adjacent pairs of membranes. The diluting channels include cation exchange materials and anion exchange materials that are fixed in close contacting position with respect to each other and provide conductive paths for cations and anions to the adjacent membranes and provide flow passages for water between the materials. The anion exchange materials and cation exchange materials each have a characteristic dimension that is smaller than the characteristic dimensions of the flow passages. The use of exchange materials with small dimensions and the fixed intimate contact of cation and anion exchange materials provides increased, uniform water splitting and resin regeneration, and a high rate of ion removal from the water flowing through the diluting channels compartments.

Particular embodiments of the invention may include one or more of the following features. Individual particles of cation exchange material and anion exchange material can be fixed together with a binder in sufficient particle concentration to provide conductive paths for cations and anions. The particles of cation exchange material, anion exchange material and binder can form larger combined particles packed into the diluting flow channel in contacting relation between adjacent membranes. The combined particles are sufficiently large so as to cause an acceptably low pressure drop in the diluting flow channel. Alternatively, the particles of the cation exchange material and the anion exchange material and binder can form filaments provided as a matrix between the adjacent membranes. The openings in the matrix for water flow are larger than the diameter of the filaments. A further alternative is to have particles of cation exchange material, anion exchange material and binder form an open cell foam between adjacent membranes, with the openings in the foam being sufficiently large to provide flow passages through the foam with an acceptably low pressure drop.

The fixed ion exchange material could also be provided as cation exchange filaments and anion exchange filaments that are intimately commingled or joined together. When the fixed ion exchange materials are in the form of filaments, they can be provided in multiple filament bunches or as multiple filament braids. The strands, made of bunches, braids, or individual filaments, can be fixed with respect to other strands by providing them as a woven fabric, non-woven (randomly oriented) fabric or extruded netting. The fabric could also be provided by extrusion.

Preferably the majority of combined particles have dimensions greater than 0.1 mm, and the majority of individual particles of the cation and anion exchange material have dimensions less than 0.01 mm. The combined particles preferably are sufficiently large so as to cause an acceptably low pressure drop (e.g., less than 100 psig) in the diluting flow channel. The filaments can have diameters between 0.1 mm and 3.0 mm. The fabric includes groups of generally parallel filaments, with filaments spaced center-to-center by a distance equal to or greater than the diameter of filaments. The binder used to fix the individual cation and anion particles is preferably a thermoplastic polymer or thermosetting polymer, but can be any water insoluble bonding material. The cation and anion exchange materials are made of styrenic ion exchange resin, acrylic ion exchange resin, phenolic ion exchange resin, or carbohydrate ion exchange resin.

In another aspect, the invention features, in general, obtaining an increased velocity in the diluting channels of electrodeionization apparatus by reintroducing a portion of the water from the diluting channel outlet to the diluting channel inlet or using flow diverters in the diluting channel to provide a tortuous path for the flowing water, while keeping the volume of the diluting channel substantially unchanged. The diffusion distance is decreased by increasing the velocity of the water flowing past the ion exchanged particles.

Embodiments of the invention may include one or more of the following advantages. A substantially spatially uniform rate of water splitting is achieved in the diluting channels; the uniform rate is conducive to a high and uniform degree of resin regeneration and consequently a high rate of ion removal from the water flowing through the diluting compartments. The uniform regeneration of the anion resin additionally facilitates removal of silica and carbon dioxide. The small size of the ion exchanging particles or filaments insures that numerous and uniformly distributed sites for water splitting are created without creating excessive pressure drops, because the dimension of the passages for water flow can be made larger, without affecting adversely the water splitting properties of the material.

Other advantages and features of the invention will be apparent from the following description of particular embodiments thereof and from the claims.

DETAILED DESCRIPTION OF A PARTICULAR EMBODIMENT

Figure 1:
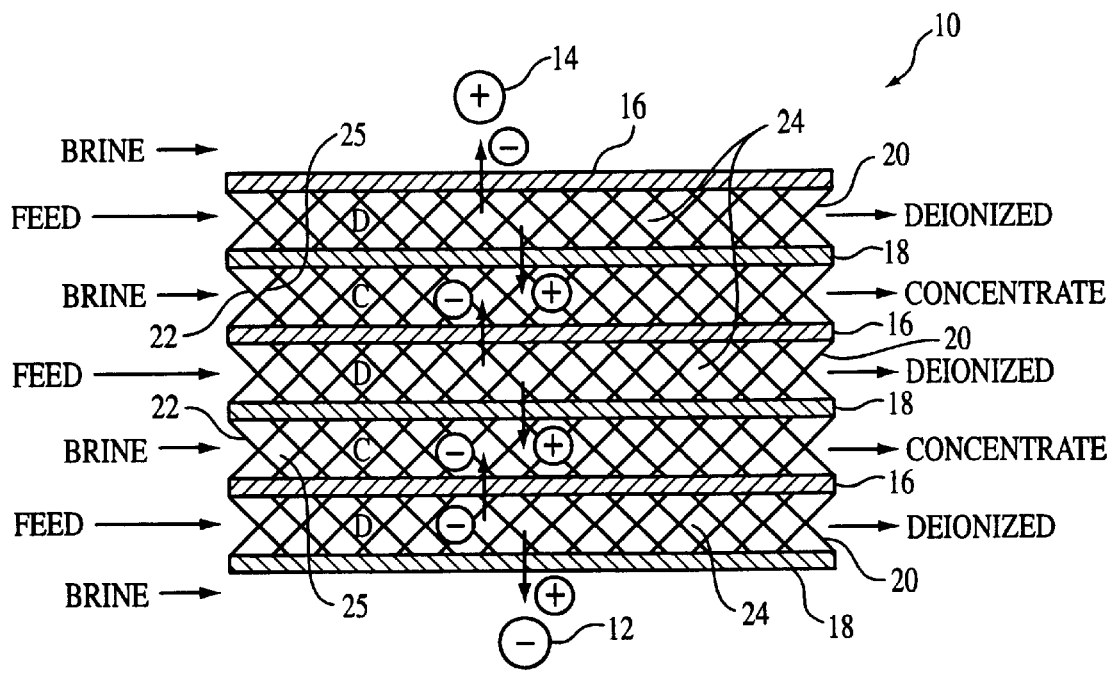
FIG. 1 is a diagram of electrodeionizing apparatus.

Referring to FIG. 1 electrodeionization apparatus 10 includes cathode 12, anode 14 spaced from cathode 12, and a plurality of alternating anion permeable membranes 16, and cation permeable membranes 18. Diluting channels 20 ("D") are provided between each pair of an anion permeable membrane 16 that faces anode 14 and a cation permeable membrane 18 that faces cathode 12. Concentrating channels 22 ("C") are provided between each pair of an anion permeable membrane 16 that faces cathode 12 and a cation permeable membrane 18 that faces anode 14. Diluting channels 20 and concentrating channels 22 can be about 3.0 mm thick. Fixed ion exchange materials 24 are located in diluting channels 20, and ion exchange materials or other spacers 25 are located in concentrating channels 22. As discussed in detail below, fixed ion exchange materials 24 can take a variety of forms. Cathode 12, anode 14, membranes 16, 18 and spacer materials 25 can be made of components and materials typically used in electrodeionization apparatus, as described, e.g., in the above-referenced patents, which are hereby incorporated by reference. Water flows are provided past cathode 12 and anode 14. As is well known in the art, the components shown on FIG. 1 are assembled together as a stack between the pressure plates held together by bolts or a hydraulic ram or in a housing that contains the components and provides manifolds to direct the incoming liquid to and the outgoing liquid from diluting channels 20 and concentrating channels 22. Diluting channels 20 and concentrating channels 22 are typically between 1.0 mm and 5.0 mm thick, and there typically are 10 to 300 diluting channels. The surface area of each membrane is typically between 0.5 and 5.0 square feet.

Figure 2:
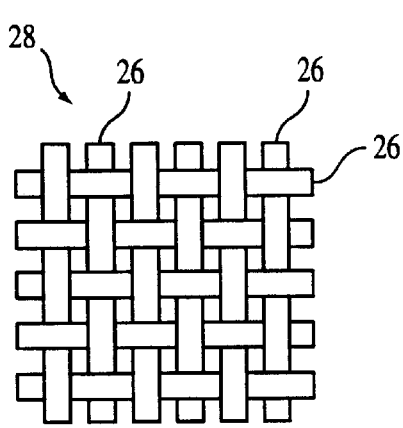
FIG. 2 is a diagrammatic plan view of a woven fabric of deionizing material used in a diluting channel of the FIG. 1 apparatus.
Figure 3:
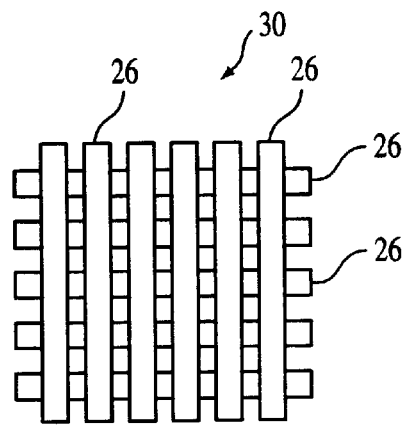
FIG. 3 is a diagrammatic plan view of a fabric of extruded netting of deionizing material used in a diluting channel of the FIG. 1 apparatus.
Figure 4:
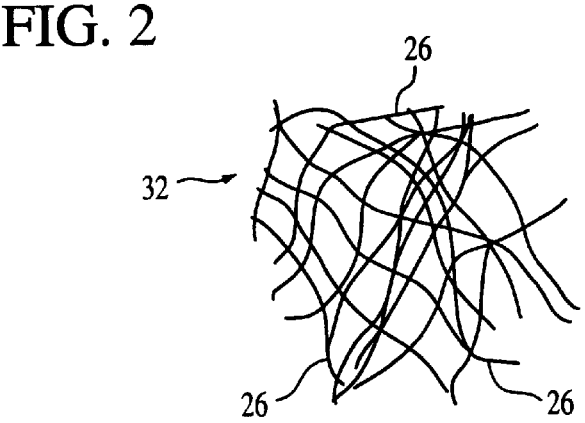
FIG. 4 is a diagrammatic plan view of a nonwoven fabric of (randomly oriented) strands of deionizing material used in a diluting channel of the FIG. 1 apparatus.

Fixed ion exchange materials 24 include cation exchange materials and anion exchange materials that are fixed in close contacting position with respect to each other. Fixed ion exchange materials 24 can be provided in strands 26 of combined anion and cation exchange materials in woven fabric 28 (FIG. 2), extruded netting fabric 30 (FIG. 3) and nonwoven fabric 32 of randomly oriented strands 26 (FIG. 4). Fixed ion exchange materials could also be provided by open cell foam 50 (FIG. 9) and by combined exchange particles 60 (FIG. 10).

Figure 5:
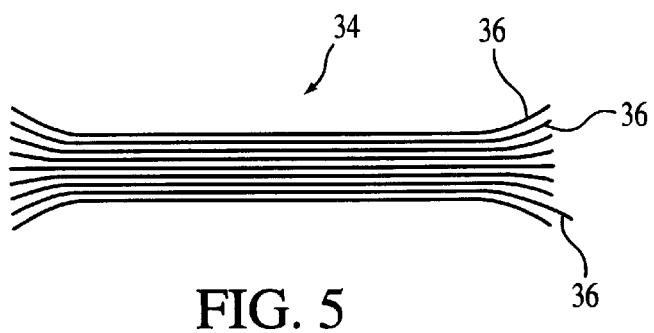
FIG. 5 is a diagrammatic elevation of a multifilament strand of deionizing material useful in the FIG. 2, 3 or 4 fabric.
Figure 6:
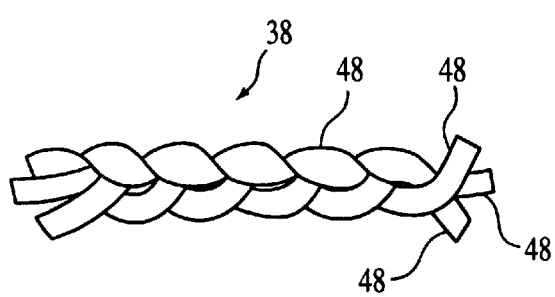
FIG. 6 is a diagrammatic elevation of a braided strand of multifilaments of deionizing material useful in the FIG. 2, 3 or 4 fabric.
Figure 7:
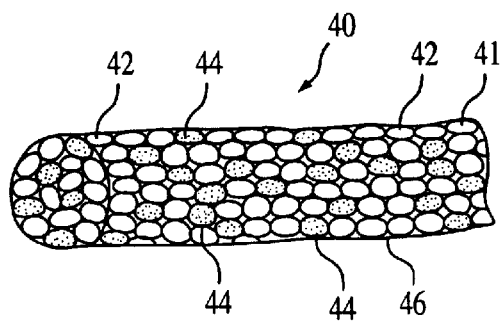
FIG. 7 is a diagrammatic perspective view of a filament that contains cation exchange and anion exchange fibers in a binder and can be used in the FIG. 2, 3 or 4 fabric.
Figure 8:
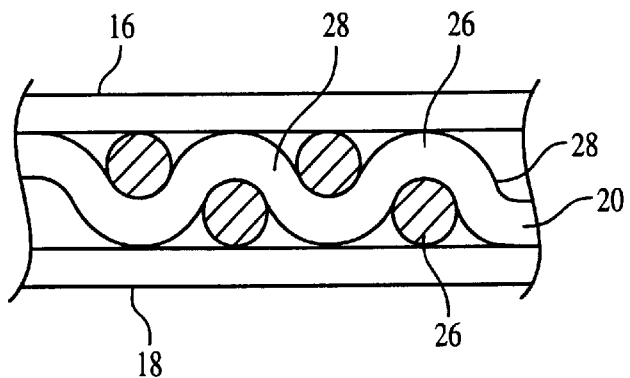
FIG. 8 is a diagrammatic vertical sectional view showing the woven fabric of FIG. 2 in a diluting channel of the FIG. 1 device.

Strands 26 (FIGS. 2–4) can also take a variety of forms. Strand 26 can be made in the form of bundle 34 of multiple filaments 36, as shown in FIG. 5. Strand 26 can also be in the form of braided strand 38, as shown in FIG. 6; braid 38 is made on a standard braiding machine. Strand 26 can also be in the form of combined exchange particle filament 40, which is made of cation exchange particles 42 (shown white on FIG. 7) and anion exchange particles 44 (shown dark on FIG. 7) that are held together by binder 46. Filaments 36, used in bundle 34 (FIG. 5), could be made of roughly equal, commingled amounts of individual filaments of cation exchange material and individual filaments of anion exchange material. Alternatively, combined exchange particle filaments 40 (FIG. 7), each having cation exchange particles and anion exchange particles, could be used as filaments 36 in bundle 34. Combined exchange particle filaments 40 could similarly be used in making braid 38, using either a single filament 40 or a plurality of filaments 40 in each braided together portion 48 of braid 38. Each portion 48 of braid 38 could also be made of a plurality of commingled filaments of cation exchange material and filaments of anion exchange material.

Figure 9:
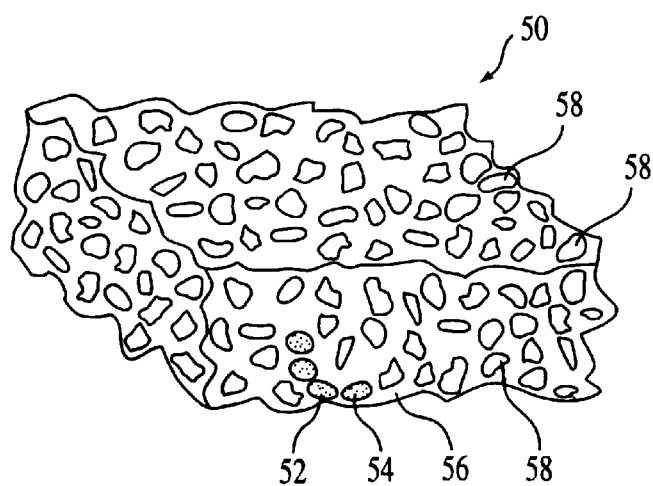
FIG. 9 is a diagrammatic perspective view of an open cell foam that contains cation exchange and anion exchange materials therein and can be used in a diluting channel of the FIG. 1 apparatus.

Referring to FIG. 9, fixed ion exchange materials 24 could also be provided as open cell foam 50, which (like filaments 40), includes cation exchange particles 52, anion exchange particles 54 and binder 56. Open cell foam 50 has an interconnected network of flow passages 58 therethrough.

Figure 10:
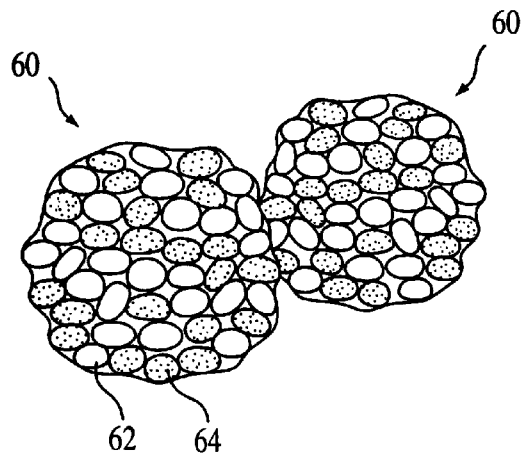
FIG. 10 is a diagrammatic elevation of combined ion exchange particles useful in the diluting channel of the FIG. 1 apparatus.

Referring to FIG. 10, fixed ion exchange materials 24 could also be provided as combined particles 60, made up of cation exchange particles 62 (shown white), anion exchange particles 64 (shown dark) and binder 66. Combined particles 60 are sufficiently large so as to cause an acceptably low pressure drop in diluting flow channels 20 in the space between combined particles 60.

Individual cation exchange particles 42, 52 and 62 and anion exchange particles 44, 54 and 64 in filament 40 (FIG. 7), foam 50 (FIG. 9), and combined particle 60 (FIG. 10), respectively, have dimensions (roughly a diameter) of less than 0.1 mm, preferably less than 0.05 mm. Individual filaments 36 in bundle 34 (FIG. 5) and in braided strand 38 are between 0.01 mm and 1.0 mm in diameter. Strands 26, bundles 34, braid 38, combined exchange particle filament 40 and combined particle 60 have diameters between 0.1 mm and 3.0 mm. Particles 42, 44, 62, and 64 are preferably less than $\frac{1}{3}$ the diameter of combined exchange particle filament 40 or combined particle 60, respectively.

Particles 42, 44, 52, 54, 62, 64 are provided in sufficient particle concentration to provide conductive paths for cations and anions through the bulk filament, foam, or combined particle structure, respectively. The volumetric concentration of the anion plus cation particle should exceed 60% and preferably is about 70%.

In all described examples of fixed ion exchange materials 24, there is an intimate fixed, mixture of cation exchanging material and anion exchanging material, and the individual particles or filaments of the exchange materials have a small size. The small size of the ion exchanging particles or filaments and the intimate relationship of the two types of exchange resin insures numerous and uniformly distributed sites for water splitting. In all examples (FIGS. 2–10) there also are relatively large passages for the flow of water when compared to the particle size, thus providing good water splitting without excessive pressure drop. In particular, the respective ion exchanging materials have a characteristic dimension that is smaller than the characteristic dimensions of the passages through which the purified water flows. For the individual filaments of ion exchanging material, the characteristic dimension is the diameter of the filament. For the individual particles of ion exchanging material 42, 44, 52, 54, 62, 64, the characteristic dimension is the diameter (or width) of the individual particles. The flow passages in all examples are not determined by spaces between individual particles or filaments, but instead are determined by the larger dimensions of the overall strands (for FIGS. 2–7 and 9) or the combined particles (FIG. 10). As appears from the figures, the flow passages around the larger structures are substantially larger than the dimensions of the individual particles or filaments. Passages 58 in open cell foam 50 are also substantially larger than the individual cation and anion exchange particles 52, 54 in foam 50. In manufacture, the majority of apparatus 10 is made and assembled the same as for known deionization apparatus. Anion and cation exchange filaments 36 and the individual anion and cation exchange filaments used in braid 38 can be made from any of the well-known ion exchange materials, e.g., styrenic ion exchange resin, acrylic ion exchange resin, phenolic ion exchange resin, and carbohydrate ion exchange resin. Individual ion exchange particles 42, 44, 52, 54, 62 and 64 can be made from the same well-known materials. Binder 44 and binder 64 can be any of the well-known thermoplastic polymers or thermosetting polymers used in the manufacture of ion permeable membranes. Binder 54 can be any suitable foam material such as polyurethane.

The individual filaments made of either cation exchange resin or anion exchange resin can be made by known techniques, e.g., as described in the above-referenced patents. The combined exchange particle filament 40 and combined particle 60 are made by obtaining (e.g., from a commercially available source) individual anion exchange particles and anion exchange particles in the desired size and approximately equinormal amounts, and then applying the binder 46 and 66 using the same techniques as used for making ion selective membranes, as described in the above-referenced patents. Open cell foam 50 is similarly made by known techniques for open cell material, adding the individual anion and cation exchange particles prior to initiating the reaction that creates the foam.

When using a fabric for fixed ion exchange materials 24, one or more layers of fabric 28, 30 or 32 is simply placed between membranes 16 and 18. When using open cell foam 50, it also is simply placed between membranes 16 and 18. In both cases, there is no need to pack individual ion exchange material particles, and there is no need for efforts to obtain uniform packing of particles in the diluting channel. When using combined particles 60 for fixed ion exchange materials 24, one packs the diluting channel with particles using the same techniques as presently used to pack ion exchange particles except that there is no need to obtain uniformity in the relative amounts of cation exchange particles and anion exchange particles, because only one type of particle is being added.

In operation of deionization apparatus 10, feed and brine are supplied to diluting channels 20 and concentrating channels 22, respectively, at typical flow rates (e.g., 1 to 3 cm/sec) and pressure (e.g., 5 to 50 psig), and electric power is supplied to cathode 12 and anode 14 to provide an appropriate current density of 2 to 15 mA/square cm and voltage of 1 to 5 volts per cell pair. The feed supplied to the inlets of diluting channels 20 is typically the permeate from a reverse osmosis process. The brine supplied to the inlets of concentrating channels 22 is typically a mixture of the reverse osmosis permeate and brine recirculated from the outlet of the electrodeionization apparatus.

The removal of ions from diluting channels 20 includes two steps. The first step is the diffusion of cations to the cation exchanging solids and the diffusion of anions to the anion exchanging solids. The second step is electrical conduction within the solid phases to the bounding membranes of the diluting compartment.

The concentration of the ion in question at the surface of the ion exchanging solid is in equilibrium with the concentration of that ion in the solid. It is desired to increase the exchanging sites having hydrogen ions and hydroxide ions to increase the transfer of ions from the liquid to the solid. The regeneration of exchanging sites with hydrogen ions and hydroxide ions is promoted by water splitting. Thus, by providing numerous, uniformly distributed sites for water splitting (the interfaces between individual ion exchanging particles or filaments), the transfer of ions to the solid is promoted. Because transfer to the solid is the limiting step in the removal of ions, the efficiency of apparatus 10 in removing ions is improved.

The applied electric field then causes anions on the exchanging material to travel along the anion exchanging material in a conductive path to and through the anion permeable membrane into the concentrating compartment nearer the anode. The applied electric field similarly causes cations to travel along the cation exchanging materials in a conductive path to and through the cation permeable membrane into the concentrating compartment nearer the cathode. The anions and cations become trapped in the concentrating compartments because the movement of anions toward the anode is blocked by a cation permeable membrane, and the movement of cations toward the cathode is blocked by an anion permeable membrane.

By providing numerous, uniformly distributed sites for water splitting in the diluting channels, the removal of ions is improved, and the ion concentration in the deionized output is advantageously decreased without excessive pressure drops.

Other embodiments of the invention are within the scope of the appended claims. For example, fixed ion exchange material could be usefully used in the concentrating channels 22 as well. Also, a fabric of fixed ion exchange materials 24 could also be made by extrusion.

Figure 11:
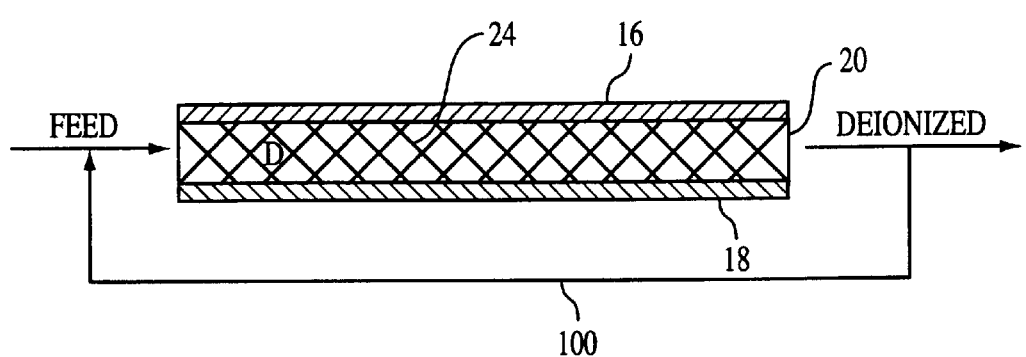
FIG. 11 is diagram showing a partial recirculation loop that can be used with the FIG. 1 apparatus.
Figure 12:
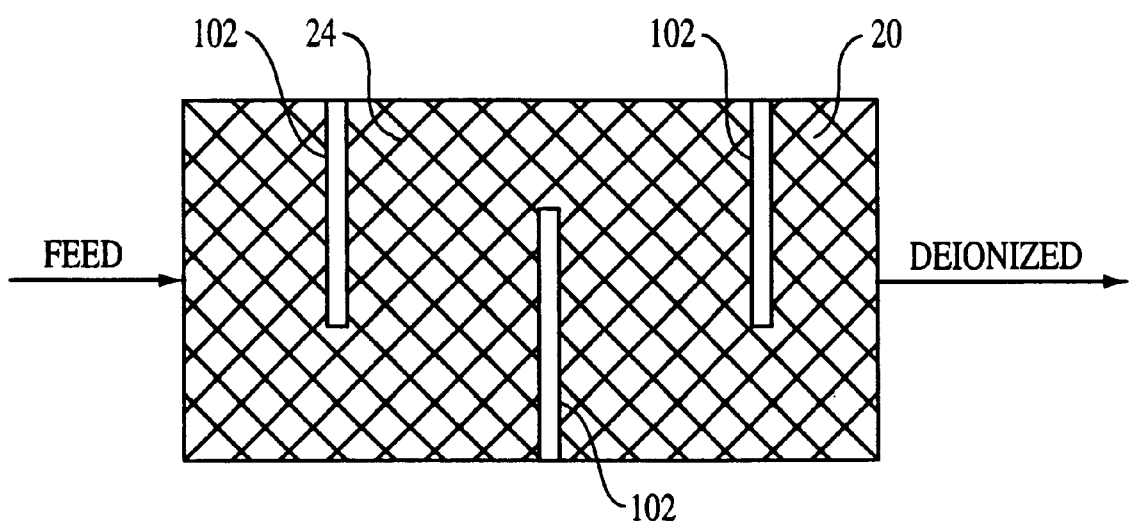
FIG. 12 is a diagrammatic plan view showing the use of flow diverters in diluting channels of the FIG. 1 apparatus.

It is also possible to increase the rate of diffusion of ions from the fluid to the surface of the ion exchanging materials 24, by increasing the velocity of the fluid relative to ion exchanging materials 24. This goal can be accomplished, without reducing the residence time in the electrodeionization apparatus, which would counteract the benefits of the higher velocity, by two techniques shown in FIGS. 11 and 12. The first (FIG. 11) involves mixing a portion of the water leaving the diluting channel 20 with the feed water entering channel 20 using recirculating loop 100. This increases the velocity of the water and also results in a dilution of the feed water and thus an improved water purity. The second technique involves providing a serpentine path whose cross section, normal to the flow direction, is smaller than the cross section of the electrodeionization compartments. This is achieved by placing non-permeable obstructions 102 in the flow path so as to create a tortuous path for the flowing water, while keeping the volume of the diluting compartment substantially unchanged.

What is claimed is:

1. Electrodeionization apparatus for purifying water comprising
   a cathode,
   an anode spaced from said cathode,
   a plurality of alternating anion permeable membranes and cation permeable membranes between said cathode and anode defining concentrating and diluting flow channels, each channel being defined between an adjacent pair of membranes, the anion permeable membrane defining a diluting channel being closer to said anode than said diluting flow channel, the cation permeable membrane defining a diluting channel being closer to said cathode than said diluting flow channel, and
   individual cation exchange particles or filaments and individual anion exchange particles or filaments that are intermixed and fixed in close contacting position with respect to each other in said diluting flow channels so as to provide a plurality of larger, discrete combined structures having numerous sites for water splitting at numerous regions of contact of anion and cation material within each combined structure and provide conductive paths for cations and anions to said adjacent membranes for said diluting flow channel and provide flow passages that are substantially larger than said particles or filaments for water between said discrete combined structures.

2. The apparatus of claim 1, wherein said individual cation exchange particles or filaments and said individual anion exchange particles or filaments are individual cation and anion exchage particles that are fixed together with a binder in sufficient particle concentration to provide conductive paths for cations and anions.

3. The apparatus of claim 2 wherein said combined structures are larger combined particles packed into said diluting flow channel in contacting relation between said adjacent membranes.

4. The apparatus of claim 3 wherein the majority of said combined particles have dimensions greater than 0.1 mm.

5. The apparatus of claim 4 wherein the majority of said individual particles of said cation and anion exchange material have dimensions less than 0.01 mm.

6. The apparatus of claim 3 wherein said combined particles are sufficiently large so as to cause an acceptably low pressure drop in said diluting flow channel.

7. The apparatus of claim 6 wherein said pressure drop is less than 100 psig.

8. The apparatus of claim 3 wherein said binder is a member selected from the group consisting of thermoplastic polymers and thermosetting polymers.

9. The apparatus of claim 2 wherein said combined structures are composite filaments provided as a matrix between said adjacent membranes.

10. The apparatus of claim 9 wherein said composite filaments are provided as one or more layers of woven or nonwoven cloth between said adjacent membranes.

11. The apparatus of claim 10 wherein said composite filaments have diameters between 0.1 mm and 3.0 mm.

12. The apparatus of claim 10 wherein said cloth includes groups of generally parallel composite filaments, with composite filaments spaced center-to-center by a distance equal to or greater than the diameter of composite filaments.

13. The apparatus of claim 9 wherein said binder is a member selected from the group consisting of thermoplastic polymers and thermosetting polymers.

14. The apparatus of claim 1, wherein said individual cation exchange particles or filaments are in the form of cation exchange material filaments, and said individual anion exchange particles or filaments are in the form of anion exchange material filaments, and said cation exchange material filaments and anion exchange material filaments are combined together in multifilament strands provided as a matrix between said adjacent membranes.

15. The apparatus of claim 14 wherein said multifilament strands are braided strands.

16. The apparatus of claim 14 wherein said strands are provided as one or more layers of woven or nonwoven cloth between said adjacent membranes.

17. The apparatus of claim 14 wherein said filaments have diameters between 0.01 mm and 0.1 mm, and said strands have diameters between 1.0 mm and 3.0 mm.

18. The apparatus of claim 14 wherein said matrix includes groups of said strands arranged generally parallel to each other and having a diameter, with strands spaced center-to-center by a distance equal to or greater than the diameter of strands.

19. The apparatus of claim 1 wherein said cation exchange particles or filaments are made of a material selected from the group consisting of styrenic ion exchange resin, acrylic ion exchange resin, phenolic ion exchange resin, and carbohydrate ion exchange resin.

20. The apparatus of claim 1 wherein said anion exchange particles or filaments are made of a material selected from the group consisting of styrenic ion exchange resin, acrylic ion exchange resin, phenolic ion exchange resin, and carbohydrate ion exchange resin.

21. Electrodeionization apparatus for purifying water comprising
   a cathode,
   an anode spaced from said cathode,
   a plurality of alternating anion permeable membranes and cation permeable membranes between said cathode and anode defining concentrating and diluting flow channels, each channel being defined between an adjacent pair of membranes, the anion permeable membrane defining a diluting channel being closer to said anode than said diluting flow channel, the cation permeable membrane defining a diluting channel being closer to said cathode than said diluting flow channel, and
   cation exchange materials and anion exchange materials that are fixed in close contacting position with respect to each other in said diluting flow channels, said materials in each said diluting flow channel providing conductive paths to said adjacent membranes for said diluting flow channel and providing flow passages for water between said materials,
   wherein said particles of said cation exchange material and said anion exchange material are intermixed and fixed together in a binder to form an open cell foam having numerous sites for water splitting at numerous regions of contact of anion and cation material between said adjacent membranes, the openings in the foam being substantially larger than said particles and sufficiently large to provide said flow passages with an acceptably low pressure drop in said diluting flow channel.

22. The apparatus of claim 21 wherein said pressure drop is less than 100 psig.

23. The apparatus of claim 21 wherein said binder is a polyurethane foam.

24. Electrodeionization apparatus for purifying water comprising a cathode, an anode spaced from said cathode, a plurality of alternating anion permeable membranes and cation permeable membranes between said cathode and anode defining concentrating and diluting flow channels, each channel being defined between an adjacent pair of membranes, the anion permeable membrane defining a diluting channel being closer to said anode than said diluting flow channel, the cation permeable membrane defining a diluting channel being closer to said cathode than said diluting flow channel, and cation exchange materials and anion exchange materials that are fixed in close contacting position with respect to each other in said diluting flow channels, said materials in each said diluting flow channel providing conductive paths to said adjacent membranes for said diluting flow channel and providing flow passages for water between said materials, individual particles of said cation exchange material and said anion exchange material being intermixed and fixed together with a binder to form larger combined particles having numerous sites for water splitting at numerous regions of contact of anion and cation material within each combined particle packed into said diluting flow channel in contacting relation between said adjacent membranes, said cation exchange material and anion exchange material being in sufficient particle concentration to provide conductive paths, said flow passages being provided in the spaces between and around said larger combined particles, said flow passages being substantially larger than said particles.

25. Electrodeionization apparatus for purifying water comprising a cathode, an anode spaced from said cathode, a plurality of alternating anion permeable membranes and cation permeable membranes between said cathode and anode defining concentrating and diluting flow channels, each channel being defined between an adjacent pair of membranes, the anion permeable membrane defining a diluting channel being closer to said anode than said diluting flow channel, the cation permeable membrane defining a diluting channel being closer to said cathode than said diluting flow channel, and cation exchange materials and anion exchange materials that are fixed in close contacting position with respect to each other in said diluting flow channels, said materials in each said diluting flow channel providing conductive paths to said adjacent membranes for said diluting flow channel and providing flow passages for water between said materials, individual particles of said cation exchange material and said anion exchange material being intermixed and fixed together with a binder to form filaments provided as a matrix having numerous sites for water splitting at numerous regions of contact of anion and cation material within each filament between said adjacent membranes, said cation exchange material and anion exchange material being in sufficient particle concentration to provide conductive paths, said flow passages being provided in the space between and around said filaments, said flow passages being substantially larger than said particles.

26. Electrodeionization apparatus for purifying water comprising a cathode, an anode spaced from said cathode, a plurality of alternating anion permeable membranes and cation permeable membranes between said cathode and anode defining concentrating and diluting flow channels, each channel being defined between an adjacent pair of membranes, the anion permeable membrane defining a diluting channel being closer to said anode than said diluting flow channel, the cation permeable membrane defining a diluting channel being closer to said cathode than said diluting flow channel, and cation exchange materials and anion exchange materials that are fixed in close contacting position with respect to each other in said diluting flow channels, said materials in each said diluting flow channel providing conductive paths to said adjacent membranes for said diluting flow channel and providing flow passages for water between said materials, said cation exchange materials being in the form of cation exchange material filaments, said anion exchange materials are in the form of anion exchange material filaments, said cation exchange material filaments and anion exchange material filaments being intermixed and combined together in multi-filament strands provided as a matrix having numerous sites for water splitting at numerous regions of contact of anion and cation material within each multi-filament strand between said adjacent membranes, said flow passages being provided in the space between and around said multi-filament strands, said flow passages being substantially larger than said filaments.

27. A method of purifying water comprising providing a cathode, an anode spaced from said cathode, and a plurality of alternating anion permeable membranes and cation permeable membranes between said cathode and anode defining concentrating and diluting flow channels, each said channel being defined between an adjacent pair of said membranes, each said diluting flow channel having individual cation exchange particles or filaments and individual anion exchange particles or filaments that are intermixed and fixed in close contacting position with respect to each other so as to provide a plurality of larger, discrete combined structures having numerous sites for water splitting at numerous regions of contact of anion and cation material within each combined structure and provide flow passages that are substantially larger than said particles or filaments for water between said combined structures, the anion permeable membrane defining a diluting channel being closer to said anode than said diluting flow channel, the cation permeable membrane defining a diluting channel being closer to said cathode than said diluting flow channel, supplying feed water into each said diluting flow channel, applying a voltage between said anode and said cathode so that said materials in each said diluting flow channel provide conductive paths for cations and anions removed from said feed water to said adjacent membranes for said diluting flow channels, removing purified water from said diluting channels, and supplying concentrating water into said concentrating channels and removing brine therefrom.

* * * * *

UNITED STATES PATENT AND TRADEMARK OFFICE
CERTIFICATE OF CORRECTION

PATENT NO. : 6,241,866 B1
DATED : June 5, 2001
INVENTOR(S) : Leon Mir

It is certified that error appears in the above-identified patent and that said Letters Patent is hereby corrected as shown below:

<u>Title page,</u>
Item [56], U.S. PATENT DOCUMENTS, add:

-- 4,313,832    02/1982    Shimizu et al……………..210/663 --

Signed and Sealed this

Twelfth Day of August, 2003

JAMES E. ROGAN
*Director of the United States Patent and Trademark Office*